No. 746,588. PATENTED DEC. 8, 1903.
W. N. SHEPHARD.
AUXILIARY CONNECTION FOR CAR COUPLINGS.
APPLICATION FILED MAR. 14, 1901.
NO MODEL. 2 SHEETS—SHEET 1.
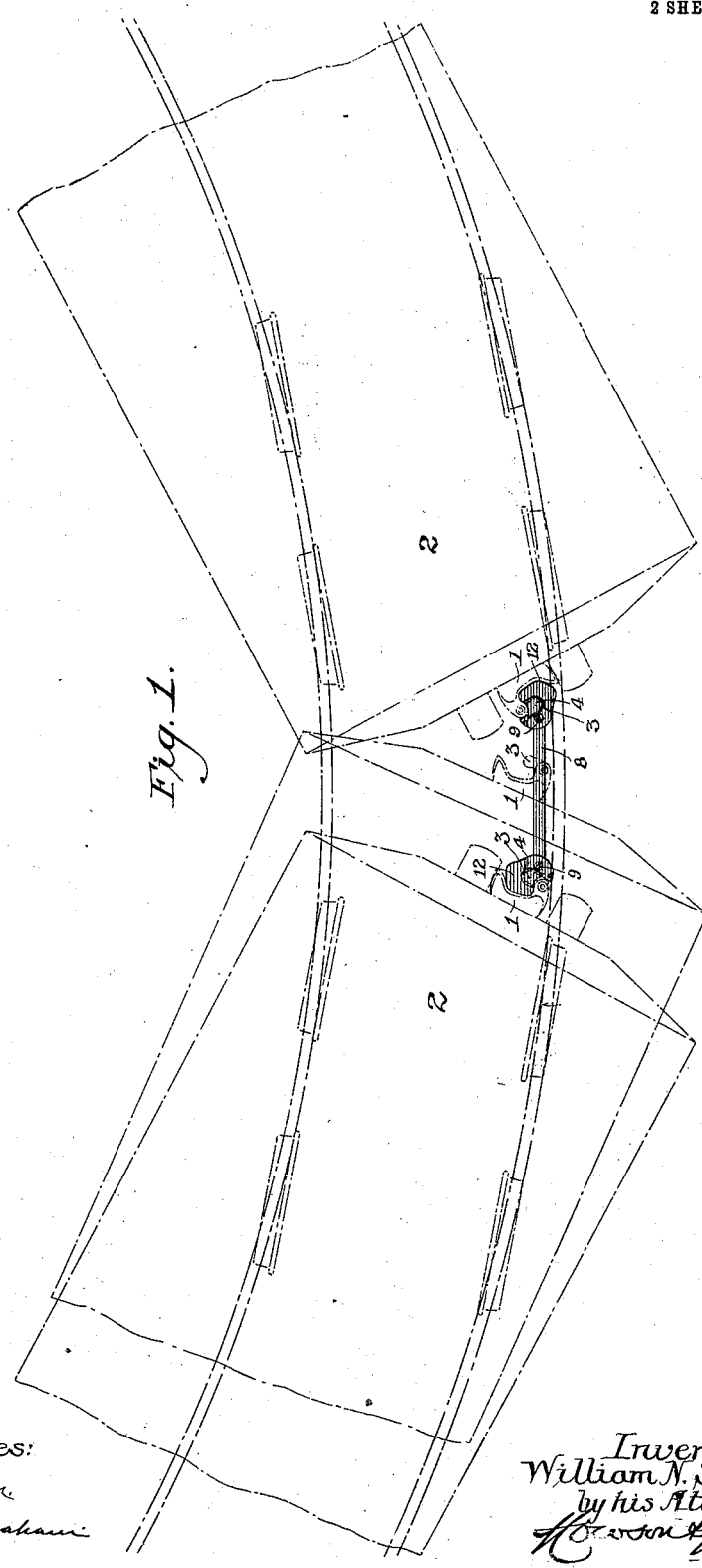
Witnesses:
Inventor:
William N. Shephard
by his Attorneys No. 746,588. PATENTED DEC. 8, 1903.
W. N. SHEPHARD.
AUXILIARY CONNECTION FOR CAR COUPLINGS.
APPLICATION FILED MAR. 14, 1901.
NO MODEL. 2 SHEETS—SHEET 2.
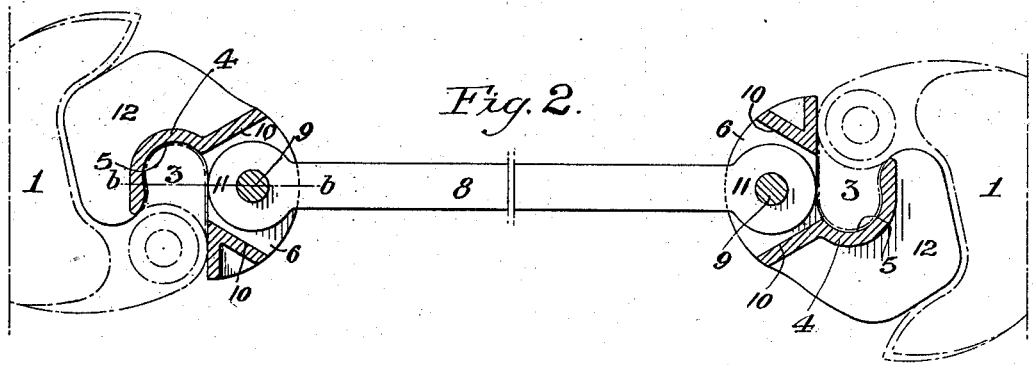
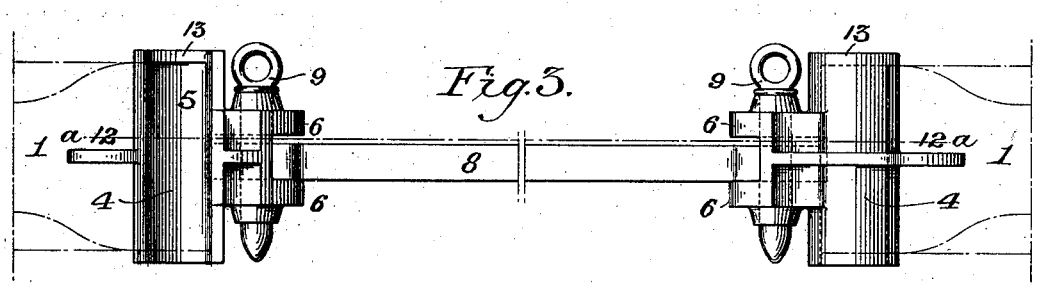
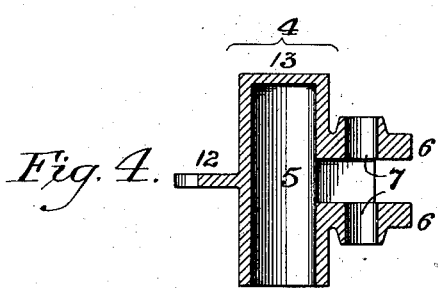
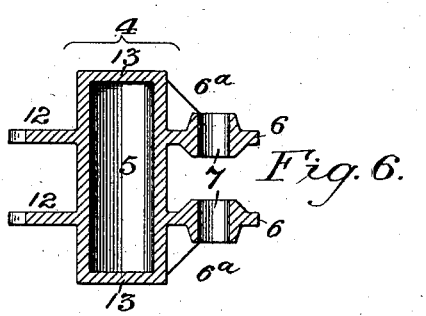
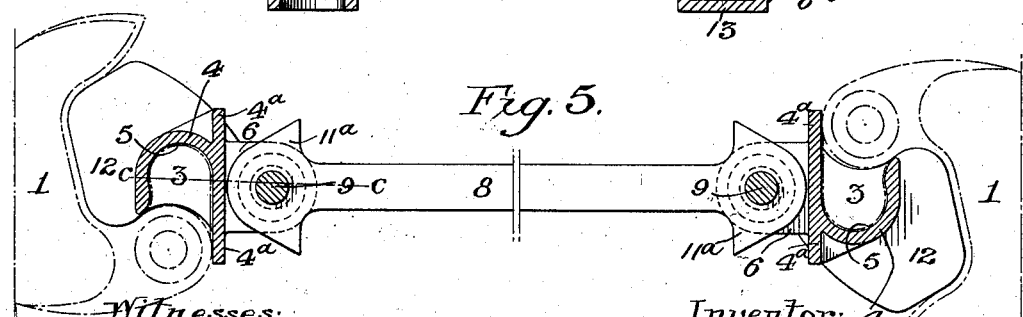
Witnesses:
Inventor:
William N. Shephard
by his Attorneys, No. 746,588. Patented December 8, 1903.

UNITED STATES PATENT OFFICE.

WILLIAM N. SHEPHARD, OF PHILADELPHIA, PENNSYLVANIA.

AUXILIARY CONNECTION FOR CAR-COUPLINGS.

SPECIFICATION forming part of Letters Patent No. 746,588, dated December 8, 1903.

Application filed March 14, 1901. Serial No. 51,172. (No model.)

*To all whom it may concern:*

Be it known that I, WILLIAM N. SHEPHARD, a citizen of the United States, residing in Philadelphia, Pennsylvania, have invented an Auxiliary Connection for Car-Couplings, of which the following is a specification.

My invention relates to car-couplings of the Master Car-Builders' or Janney type, particularly those used upon freight-cars and which are provided with solid knuckles; and it consists of an auxiliary connection for such couplings designed for the purpose of joining the cars in such manner that the space between the same is increased, thereby permitting the passage of such cars around curves of short radius.

My invention is fully illustrated in the accompanying drawings, in which—

Figure 1 is a view in diagram, showing the application of the improved connection forming the subject of my invention to the couplings of freight-cars. Fig. 2 is a plan view of the couplings of two cars, showing, partly in section on the line $a\ a$, Fig. 3, the auxiliary connection forming the subject of my invention. Fig. 3 is a side elevation of my improved auxiliary connection. Fig. 4 is a sectional view of one of the members of the auxiliary connection, taken on the line $b\ b$, Fig. 2. Fig. 5 is a view similar to Fig. 2, illustrating another application of my invention; and Fig. 6 is a sectional view of one of the members of the connection shown in Fig. 5, taken on the line $c\ c$.

When switching freight-cars into and out of warehouses in large cities, or in and out of freight-yards from or to a main track, to or from a siding having a curve of short radius, great difficulty has been experienced with the type of coupling now in general use. In most instances the curves are too sharp to permit the engagement of the couplings, as the cars will contact at the corners before the couplings can engage each other. To overcome this difficulty, ordinary links are brought into use between the couplings when the cars are to be pulled. As open links are the ones most frequently used, however, and as it is often necessary to use more than one, there is great difficulty in pushing the car so coupled. Moreover, as the swinging part of these couplings are now preferably constructed without any aperture for the coupling-pin, it will be impossible to secure an eye-bar to the same, and with such couplings a chain may only be attached by passing it over the swinging portion of the coupling and securing it with a pin.

The object of my invention is to provide a coupling or auxiliary connection that may be used with the ordinary coupling members carried by the cars for effecting a connection between such cars when upon curves of short radius.

The coupling or auxiliary connection forming the subject of my invention is intended only as an auxiliary device for temporary use as occasion may require. It is of such construction, however, that it may form a permanent connection between the cars if necessary at any time.

In the drawings herewith, 1 represents the ordinary knuckle-coupling members of the Master Car-Builders' or Janney type carried by the bodies of the cars 2. In all the figures of the drawings the auxiliary connection is illustrated in full lines; but the cars and the couplings carried by the same are shown in dotted lines in order to clearly distinguish the structure forming the subject of my invention.

Each coupling member 1 carries the usual swinging end or knuckle 3, which is held, by means of suitable mechanism located within said coupling member, in the position shown in the drawings. Adapted to engage these coupling members are the heads 4, having sockets 5, into which the swinging portions 3 of said coupling members may enter, and these heads 4 are preferably so arranged that they may be dropped into place over the swinging ends 3, and when in position they will be prevented from lateral disengagement by said swinging ends. Each head 4 is provided with projecting ears or lugs 6, having apertures 7, and between these lugs a space is provided for the reception of the end of a link or eyebar 8, such bar being held in place by the pins 9. The spaces between the lugs 6 are cut through the wall of the head 4, and such spaces are provided with flaring side walls 10 for a purpose to be shortly described.

In the form of head shown in Figs. 5 and 6 I may strengthen the lugs 6 by the addition of angular braces $6^a$. In this form, too, I do not extend the space between the lugs through the wall of the head, but dispense with the flaring portions 10, which are seen in Fig. 2, and extend said wall in a straight line by means of the side portions 4ª.

The link or eyebar 8 may be of any suitable length, depending upon the sharpness of the curve and the distance separating the cars when the latter are brought as close together as possible upon such curve. In the bar shown in Figs. 1, 2, and 3 the heads 11 of the same are of ordinary form, and when such bars are used I prefer to provide the head 4 with the flaring walls 10. The object of this construction is to prevent the bars twisting or turning when the cars are being pushed with the aid of this structure. When in such position, the sides of the bars will contact with the flaring walls 10 of the head, and thereby limit the sidewise movement of the bars.

In the heads shown in Figs. 5 and 6 I employ a bar having a blunt arrow-shaped head 11ª, and when turning a curve the faces of said head are adapted to contact with the side extensions 4ª, carried by the head, and thereby limit the sidewise movement of the bar.

The heads 4, as shown in Figs. 1 and 2, are provided with a rib or projection 12, shaped to enter and fill the space of the coupling member between the fixed portion of the same and its swinging member 3. This rib also serves to strengthen the heads 4. In the form of connection shown in Figs. 5 and 6 I have shown two such ribs as an extra precaution for any twist or strain; but in most instances it will be sufficient to use one rib.

In the form of head shown in Figs. 1 and 2 I employ a cover piece or flange 13 for the purpose of preventing such head from falling away from the coupling; but in the form shown in Figs. 5 and 6 I may employ two such flanges, one at the top and one at the bottom of the head, the lower flange serving to prevent the rise of the head portion of the auxiliary connection. When using the connection shown in Figs. 5 and 6, it will be necessary to loosen the swinging member 3 of the coupling member, so that said head may be placed in proper position, and when so placed the swinging member 3 will be returned to its normal position and locked, so as to retain the head in place.

While I prefer to use a head 4 of the character shown and described, such construction is not essential, the principal thing necessary being to provide a head or other member that may engage with and be retained by the ordinary coupling members carried by the car, such head having provision for the attachment of a link or eyebar, whereby it may be connected to a head carried by another coupling member to connect such heads.

The connection of the link or eyebar 8 and the heads 4 is accomplished by means of the coupling-pins 9, and, as has been explained, this connection is sufficiently adjustable for all practical purposes.

The heads 4 are made of uniform shape throughout, and hence are perfectly interchangeable.

Although I have described my invention as applied to the coupling members of freight-cars, it will be understood that it may be applied to the coupling members of all forms of steam or street railway cars, &c.

Having thus described my invention, I claim and desire to secure by Letters Patent—

1. The combination of the coupling members carried by the cars, swinging members carried by said couplings, auxiliary removable interlocking heads shaped to conform to the contour of, and carried by said coupling members, the swinging portion of the latter serving to hold the interlocking heads to the coupling members, and means for connecting said interlocking heads.

2. The combination of the coupling members carried by the cars having swinging projections, auxiliary interlocking heads carried by said coupling members and having sockets for the reception of the swinging projections, the latter serving to hold the interlocking heads to the coupling members, side extensions carried by said interlocking heads and filling the space between the fixed and swinging portion of the couplings, and means for connecting said interlocking heads.

3. The combination of the coupling members carried by the cars, auxiliary heads carried thereby, said heads filling the space between the fixed and movable portions of the coupling members and having a recess for the reception of said movable portion, apertured projections carried by said head, and a link or eyebar adapted to fit between said apertured projections, said link or bar being held in place by suitable pins.

4. The combination of the coupling members carried by the cars, auxiliary heads carried thereby, said heads filling the space between the fixed and movable portion of said coupling members and having a socket for the reception of said movable member, said head being flanged adjacent to the socket so as to prevent the displacement of the auxiliary head from the coupling.

5. The combination of the coupling members carried by the cars, auxiliary heads carried thereby, said heads filling the space between the fixed and movable portion of said coupling members and having a socket for the reception of said movable member and a flange carried by the upper portion of each head above the socket to prevent the dropping of said head from the coupling member, and means for connecting said coupling members.

6. The combination of the coupling members carried by the cars, interlocking heads carried thereby and having apertured projections, said projections having flaring side walls, and a link or bar adapted to coact with said flaring walls, said link or bar being held in place by means of suitable coupling-pins.

7. As a new article of manufacture, an interlocking head forming part of an auxiliary connection for car-couplings, said head being shaped to engage the swinging portion of the coupling members, having flanges to fill the space between said swinging portion and the fixed portion of the same, having means whereby it is supported by the coupling members and having also provision for the attachment of a connecting-link.

8. A connecting device for car-couplings, comprising hoods having hook-shaped portions to engage the knuckles of the couplings, caps over said hook-shaped portions adapted to support the hoods on the knuckles, and a connection between said hoods.

9. A connecting device for car-couplings, comprising two blocks constructed to be supported by the knuckles and conform to the contour of the front ends of the draw-heads, and a connection between said blocks.

10. A connecting device for car-couplings, comprising removable heads, each supported on a knuckle and approximately filling the space between the inner faces of the knuckle and the head, and means connecting said heads.

11. The combination of coupling members having pivoted knuckles, and auxiliary removable interlocking heads shaped to conform to the contour of and constructed to be confined by said coupling members when said pivoted knuckles are in the closed position, said interlocking heads being connected together and serving to flexibly connect said coupling members, substantially as described.

12. As a new article of manufacture, a connecting-bar for car-coupling members having pivoted knuckles, said connecting-bar having at each end an interlocking head shaped to conform to the contour of and constructed to be confined by said car-coupling members when the pivoted knuckles are in the closed position.

13. The combination of coupling members having pivoted knuckles, removable interlocking members shaped to conform to the contour of and constructed to be confined by said coupling members when the pivoted knuckles are in the closed position, and means for connecting said interlocking members.

14. The combination of coupling members having pivoted knuckles, auxiliary removable interlocking heads shaped to conform to the contour of and constructed to be confined by said coupling members when the pivoted knuckles are in the closed position, and a link or eyebar connecting said interlocking heads, said link being held in place by coupling-pins.

15. The combination of coupling members having pivoted knuckles, interlocking heads shaped to conform to the contour of and constructed to be confined by said coupling members when the pivoted knuckles are in the closed position, said heads providing a recess for the reception of the pivoted knuckles, and being locked to the coupling members when said knuckles are in the closed position, and means for connecting said heads.

16. As a new article of manufacture, a head forming part of an auxiliary connection for car-couplings having pivoted knuckles, said head being shaped to conform to the contour of and constructed to be confined by said coupling member when the pivoted knuckle is in the closed position, said head having means for support by the coupling member and provision for the attachment of connecting means from another head of similar character.

17. A coupler-bar for railway-cars consisting of a long bar combined with two end jaws respectively hinged to the ends of the long bar and adapted to detachably fit the jaws of the car-couplers, the said end jaws being provided with stops on each side of the hinge-points to limit the angle the bar shall make with the end jaws.

18. A coupler-bar for railway-cars consisting of a long bar combined with two end jaws respectively hinged to the ends of the long bar and adapted to detachably fit the jaws of the car-couplers, the said end jaws being provided with stops or supports adapted to catch upon the coupler-jaws to hold the end jaws suspended in operative position with the coupler-jaws.

19. A coupler-bar for railway-cars, consisting of a long bar, combined with two end jaws respectively hinged to the ends of the long bar on vertical axes and adapted to detachably fit the jaws of the car-coupler so as to be normally immovable therein.

20. In a car-coupler bar, the combination of a bar, two end jaws, one connected to each end of the bar by a hinge, the said end jaws each consisting of a rigid frame adapted to fit the jaw of a car-coupler of the Janney type and provided with overhanging portions to catch upon the coupler-jaws whereby it is held suspended in position.

21. In a car-coupler bar, the combination of a bar, two end jaws connected to each end of the bar by a hinge, the said end jaws each consisting of a rigid frame adapted to fit the jaw of a car-coupler of the Janney type and provided with overhanging portions to catch upon the coupler-jaw whereby it is held suspended in position, and stops on each side of the hinge of the bar to limit the possible lateral swing of said bar about its hinge-point.

22. In a coupler-bar for railway-cars, a long bar having at each end a jaw consisting of a rigid frame adapted to fit a car-coupler of the Janney type, the said jaws being connected through the long bar with provision for relative horizontal angular adjustment.

23. In a coupler-bar for railway-cars, a long bar having at each end a jaw consisting of a rigid frame adapted to fit a car-coupler of the Janney type, the said jaws being connected through the long bar with provisions for relative horizontal angular adjustment and provided with overhanging parts to catch upon the coupler-jaws of the cars whereby the coupler-bar is suspended.

24. In an auxiliary coupling for cars, the device for coupling the auxiliary coupling to the regular coupling, which consists of a member adapted to engage the jaw of the coupling, said member having one or more spacing-pieces extending from it, and an outwardly-extending portion adapted to rest on the knuckle and to support the auxiliary coupling device.

25. In an auxiliary coupling for cars, the device for coupling the auxiliary coupling to the regular coupling, which consists of a member adapted to engage the jaw of the coupling, said member having one or more spacing-pieces extending from it, and outwardly-extending portions, the upper one of which is adapted to rest on the knuckle, and both of which support the auxiliary coupling.

26. An auxiliary coupling device for cars consisting of a head having a projection with pin-holes extending through its top and bottom walls, and having portions connected to a member adapted to lie behind a regular coupling-knuckle and provided with one or more spacing-pieces.

27. An auxiliary coupling device for cars consisting of a head having a projection with pin-holes extending through its top and bottom walls, and its side walls disposed to contact with an engaged coupling-rod when said rod is laterally deflected to a determined degree.

In testimony whereof I have signed my name to this specification in the presence of two subscribing witnesses.

WILLIAM N. SHEPHARD.

Witnesses:
MURRAY C. BOYER,
JOS. H. KLEIN.